United States Patent
Artuso

(10) Patent No.: US 9,686,667 B2
(45) Date of Patent: Jun. 20, 2017

(54) DISTRIBUTED PAGING IN A CELLULAR TELECOMMUNICATION SYSTEM

(71) Applicant: T-Mobile USA, Inc., Bellevue, WA (US)

(72) Inventor: Daniel Frank Artuso, Concord, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/850,496

(22) Filed: Sep. 10, 2015

(65) Prior Publication Data

US 2017/0078862 A1    Mar. 16, 2017

(51) Int. Cl.
*H04W 60/00* (2009.01)
*H04W 8/00* (2009.01)
*H04W 8/08* (2009.01)
*H04W 8/14* (2009.01)

(52) U.S. Cl.
CPC ............. *H04W 8/005* (2013.01); *H04W 8/08* (2013.01); *H04W 8/14* (2013.01)

(58) Field of Classification Search
CPC ..... H04W 92/02; H04W 68/02; H04W 68/12; H04W 8/02; H04W 64/00; H04W 48/12; H04W 76/023; H04L 5/0048
USPC ...... 455/435.1, 458, 515; 370/312, 328, 353
See application file for complete search history.

(56) References Cited

U.S. PATENT DOCUMENTS

| 2008/0119209 A1* | 5/2008 | Upp ...................... H04W 68/02 455/458 |
| 2009/0285157 A1* | 11/2009 | Yeoum .................. H04W 92/02 370/328 |

* cited by examiner

*Primary Examiner* — Phuoc H Doan
(74) *Attorney, Agent, or Firm* — Lee & Hayes, PLLC

(57) ABSTRACT

In a cellular telecommunication system having multiple cells and respectively associated base stations, a user equipment (UE) is paged by sending a paging request to the base station that most recently communicated with the UE. This base station pages the UE and upon failing to receive a response forwards the paging request to its the base stations of neighboring cells Each of these base stations pages the UE and upon failing to receive a response similarly forwards the paging request to further base stations of neighboring cells. This process is repeated to repeatedly expand the paging area until the UE is located or until a forwarding limit has been reached.

28 Claims, 8 Drawing Sheets

US 9,686,667 B2

DISTRIBUTED PAGING IN A CELLULAR TELECOMMUNICATION SYSTEM

BACKGROUND

A cellular telecommunication network is typically formed by many geographic areas called cells. In a Long Term Evolution (LTE) network, each cell has an associated eNode B, which is the element of the LTE network that communicates directly with mobile handsets (referred to as user equipment or UEs). An LTE eNode B performs traditional functions of a base station and a radio network controller (RNC).

The eNode Bs are each connected to a core telecommunication network through a wired or wireless backhaul and communicate with a mobility management entity (MME) over that backhaul using what is referred to as an S1 logical interface. To communicate with each other, e.g., for telecommunication device handovers or radio resource coordination, eNode Bs use what are referred to as X2 logical interfaces between base stations.

When a UE is idle, the MME may not have current information regarding the exact cell within which the UE is currently located. In order to initiate a call to the UE, the MME sends a paging request to multiple eNode Bs. Upon receiving a paging request, an eNode B pages the UE. If the UE is in the cell associated with the eNode B, the UE receives and responds to the page. The eNode B that receives a response to the page then sends the response back to the MME.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems, devices, and techniques for paging mobile handsets or other mobile communication terminals (referred to herein as user equipment or UEs) in a cellular telecommunication network. Example implementations are discussed in the context of a Long Term Evolution (LTE) network, although the described techniques may also be used in other types of cellular telecommunication networks.

In order to initiate a call to a UE, a mobility management entity (MME) of the LTE network sends a paging request to the eNode B that most recently communicated with the UE. The paging request from the MME to the eNode B is sent using an S1 logical interface over a backhaul between the MME and the eNode B.

Upon receiving the paging request, the receiving eNode B pages the UE using the radio interface. If the eNode B fails to receive a response from the UE, the eNode B forwards the paging request to the eNode Bs of geographically neighboring network cells. The paging request is forwarded using the X2 logical interface between the eNode Bs.

Upon receiving a forwarded paging request, a receiving eNode B pages the UE using the radio interface. Upon failing to receive a response, the receiving eNode B forwards the paging request to its own neighboring eNode Bs, again using the X2 logical interface. This process is repeated for a predefined number of times, either until a page expiration time has expired or until a response is received from the UE. When one of the eNode Bs receives a response to its page, the call to the UE is initiated through that eNode B.

In some implementations, the MME may be configured to send an initial paging request to multiple eNode Bs. For example, the MME might send the paging request to each eNode of a tracking area within which the UE was known be most recently in. Tracking areas are identified by respective tracking area codes (TACs).

Figure 1A:
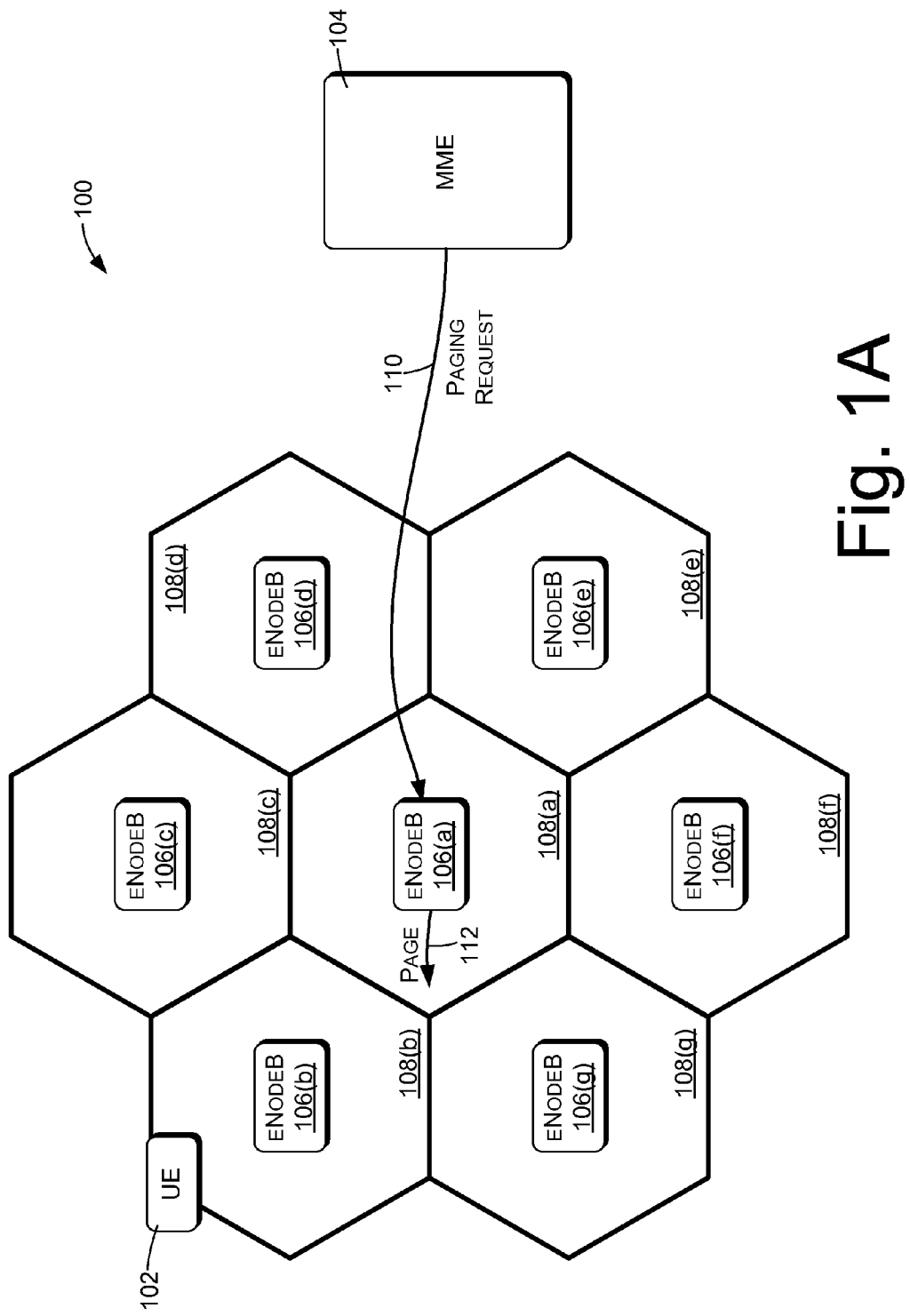
FIGS. 1A-1C are block diagrams of a portion of an example telecommunication network, illustrating a sequence of messaging that may be performed in order to page a mobile communication terminal.
Figure 1B:
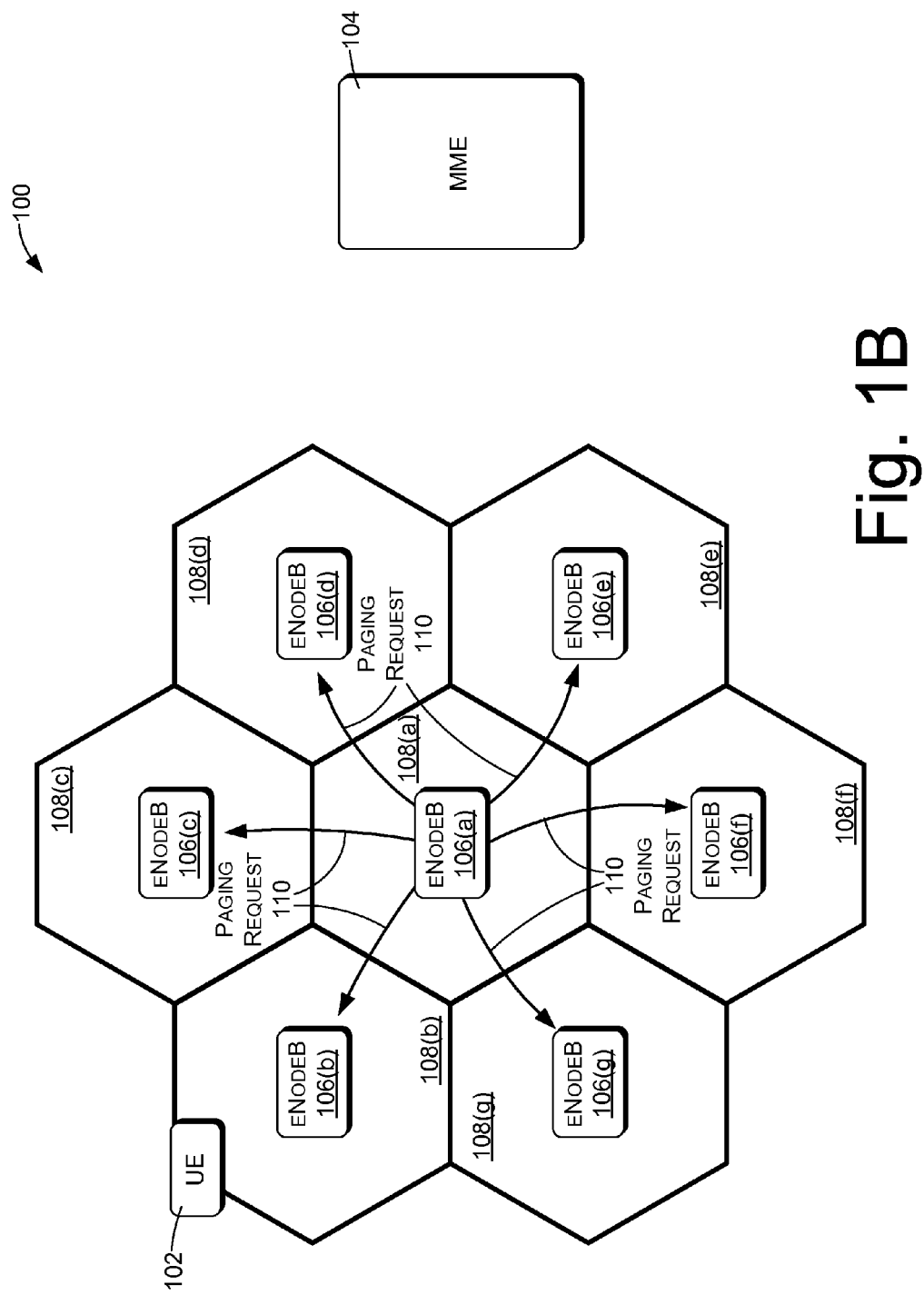
Figure 1C:
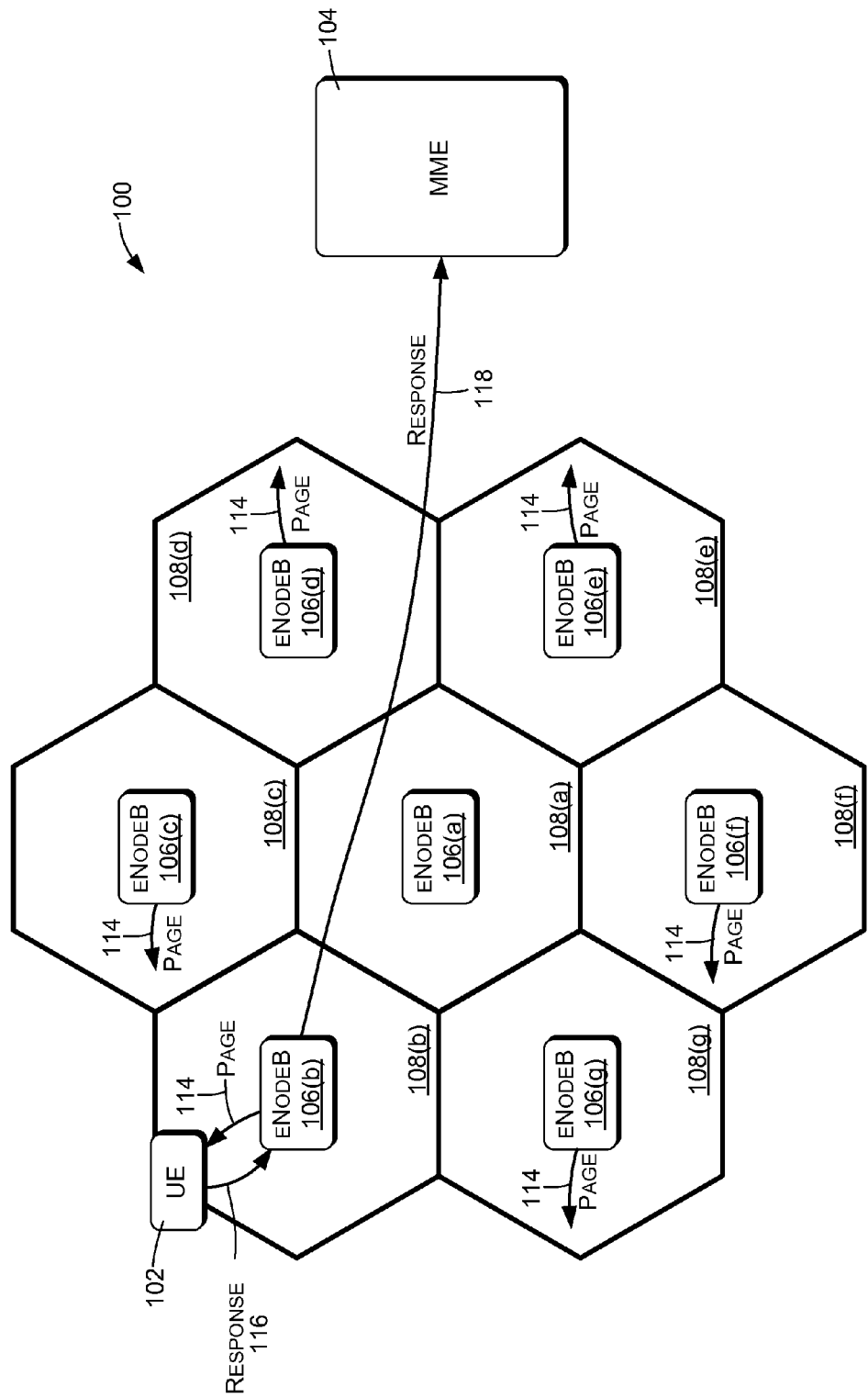

FIGS. 1A-1C illustrate an example process performed by or within a cellular communications network 100 for locating a mobile communications terminal (referred to herein as user equipment or UE) 102. The network 100 comprises a mobility management entity (MME) 104 or other component that performs network management functions. The network 100 also comprises multiple base stations 106 that are associated with respective geographic cells 108. In the LTE environment, the base stations 106 comprise eNode B base stations, and the base stations 106 are referred to herein simply as eNode Bs 106.

The MME 104 and the eNode Bs 106 may be part of a telecommunication network of a telecommunication service provider. Each cell 108 may be associated with a corresponding geographic area. The cells 108 may be any sort of cells within a telecommunication network. In some cases a cell may comprise a macrocell, a microcell, a picocell, a femtocell, smallcell, etc.

Note that in practice, the illustrated MME might comprise multiple MMEs, which may be configured to operate in a pooled manner. Accordingly, any functions described herein as being performed by the MME 104 may in practice be performed by one or more MMEs 104 working in cooperation with each other.

FIG. 1 shows seven cells 108(a)-108(g) and associated eNode Bs 106(a)-106(g), although the network 100 may comprise a much larger number of cells and associated eNode Bs. Although the cells 108 are shown in a repeating and regular pattern, cells may be distributed unevenly, may overlap, and may have different shapes. In the illustrated example, the UE 102 is within the cell 108(b) and is able to communicate wirelessly with the eNode B 106(b).

In some embodiments, each of the eNode Bs 106 is connected to the MME 104 through a wired or wireless backhaul. The eNode Bs 106 may each communicate with a router or switch of a core telecommunication network, within which the MME 104 is implemented, using the wired or wireless backhaul. Communications between each of the eNode Bs 106 and the MME 104 may use an S1 logical interface.

The eNode Bs 106 may communicate directly with each other using an X2 logical interface without going through the MME. For example, X2 communications may be between a pair of eNode Bs by means of the wired or wireless backhauls to the core telecommunication network and through a router or switch of the core telecommunication network. In some cases, point-to-point X2 communications may be implemented using microwave transceivers, WiFi modems, WiMax modems, or other radio resources directly between eNode Bs.

FIGS. 1A-1C illustrate the concept of geographically neighboring cells. Each eNode B of an LTE network maintains a data table, referred to herein as a neighbor list, which indicates geographically neighboring cells and eNode Bs. The neighbor list may be configured manually, by operators of the network 100, or may be maintained and updated automatically using techniques referred to as Automatic Neighbor Relations (ANR). Neighbor lists are typically used to facilitate UE handovers between cells 108 of the network 100.

Referring to FIG. 1A, in order to locate the UE 102 and to initiate a call to the UE 102, the MME sends a paging request 110 to the eNode B with which the UE 102 most recently communicated, which in this example is the eNode B 106(*a*). The last known cell location of each UE 102 is recorded by the MME 104 when the UE 102 periodically registers with an eNode B, when a call is initiated with the UE 102, when a call with the UE 102 is terminated, and when the UE 102 crosses a tracking area border. The paging request 110 is sent to the eNode B that the MME 104 has recorded as having last received a communication from the UE 102. The paging request 110 is sent using an S1 logical interface, which is part of the backhaul communications network that connects each of the eNode Bs with the MME 104. Note that in some implementations the paging request 110 may be sent to all of the eNode Bs within the last known tracking area of the UE 102. For example, the UE 102 may update the MME 104 whenever the UE enters a new tracking area, and the MME 104 may send the paging request to all eNode Bs within the tracking area that the UE 102 has most recently occupied. A tracking area or TA is a logical grouping of eNode Bs that is used within an LTE cellular network.

When multiple eNode Bs receive the paging request from the MME 104, each of the receiving eNode Bs responds in the manner described herein.

In response to receiving the paging request 110, the eNode B 106(*a*) sends a page 112 to the UE 102. In this example, the UE 102 is not within the cell 108(*a*) associated with the eNode B 106(*a*) and therefore the UE 102 does not receive the page 112 and the eNode B 106(*a*) does not receive a response to the page 112. In practice, the eNode B 106(*a*) may page the UE 102 multiple times, in accordance with a configurable parameter. For purposes of discussion, it will be assumed that paging a UE or sending a page to the UE may comprise attempting to page the UE one time or multiple times.

Referring now to FIG. 1B, upon failing to receive a response to the page 112, the eNode B 106(*a*) forwards the paging request 110 to the eNode Bs associated with the neighboring cells of the first eNode B 106(*a*). In this example, the neighboring cells are the cells 108(*b*)-108(*g*), and the paging request 110 is forwarded to the associated eNode Bs 106(*b*)-106(*g*) of those cells. The eNode B 106(*a*) identifies neighboring cells and associated eNode Bs by referring to the neighbor list of the eNode B 106(*a*).

Referring now to FIG. 1C, each of the neighboring eNode Bs 106(*b*)-106(*g*) receives the forwarded paging request 110 and in response sends a page 114 to the UE 102. Because the UE 102 is within the cell 108(*b*), the UE 102 receives the page 114 from the corresponding eNode B 106(*b*) and provides a response 116 that is received by the eNode B 106(*b*). The other neighboring eNode Bs 106(*c*)-106(*g*) do not receive a response from the UE 102 because the UE 102 is not within any of the corresponding cells 108(*c*)-108(*g*).

Upon receiving a response 116, the eNode B 106(*b*) sends a response 118 back to the MME 104, indicating that the UE 102 is within the cell 108(*b*) and that future communications to the UE 102 should be directed to the eNode B 106(*b*).

FIGS. 1A-1C illustrate an example in which the UE is found after one round of forwarding the paging request 110. However, the actions described above may be repeated in further rounds of forwarding, so that the area being paged grows outwardly or larger in each round. For example, the eNode B 106(*c*), upon failing to receive a response to the page 114, may forward the paging request 110 to its own neighboring eNode Bs. Any of those eNode Bs, upon failing to receive a response to a page, may again forward the paging request 110 to yet further neighboring eNode Bs. This results in an expanding area of eNode Bs from which the UE 102 is paged.

Figure 2:
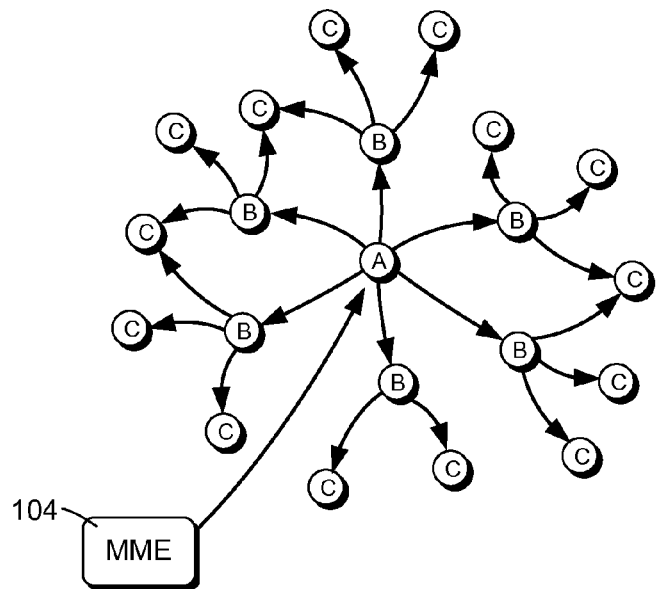
FIG. 2 is a block diagram illustrating an expanding area of paging that results from the sequence illustrated in FIGS. 1A-1C.

FIG. 2 illustrates the expanding effect resulting from multiple rounds of forwarding a paging request to neighboring cells. In FIG. 2, arrows represent the transmission of a paging request from one entity (such as an MME or eNode B) to another. Cells and associated eNode Bs are represented as nodes with alphabetic labels.

To initiate the process, the MME 104 sends a paging request for a designated UE to a first cell node "A", which as described above corresponds to the last known cell location of the UE. Upon failing to find the UE after attempting one or more times to page the UE, the first cell node A forwards the paging request to multiple second cell nodes "B," which correspond to the cells that geographically neighbor the first cell node A. Each one of the second cell nodes B, upon failing to find the designated UE, forwards the paging request to multiple neighboring third cell nodes "C". This process may continue in further rounds to add additional outward or larger rings of cells, such as a ring of "D" cells, a ring of "E" cells, etc., and to thereby encompass a larger and larger area that is nominally centered on the last known location of the UE.

Note that as the area of included cells expands, neighboring cells of a particular cell may include those cells from which the paging request was forwarded. Each cell may be configured to not forward the paging request back to the cell from which the paging request was received. Alternatively, the eNode B of each cell may be configured to ignore paging requests that have already been seen by that eNode B. Note also that a particular node may receive the paging request from two or more other nodes, and may ignore the paging request if it has already been received.

The number of rings by which the paging area is expanded may be constrained by a specified limit on the number of forwarding rounds that are performed. For example, the process described above may be limited to 9 rounds of expansion, which would result in 10 rings of cells (i.e., rings A-J). Alternatively, forwarding may be limited by time. For example, forwarding may be allowed to continue for no more than 10 seconds from the time that the MME provides the initial paging request.

Figure 3:
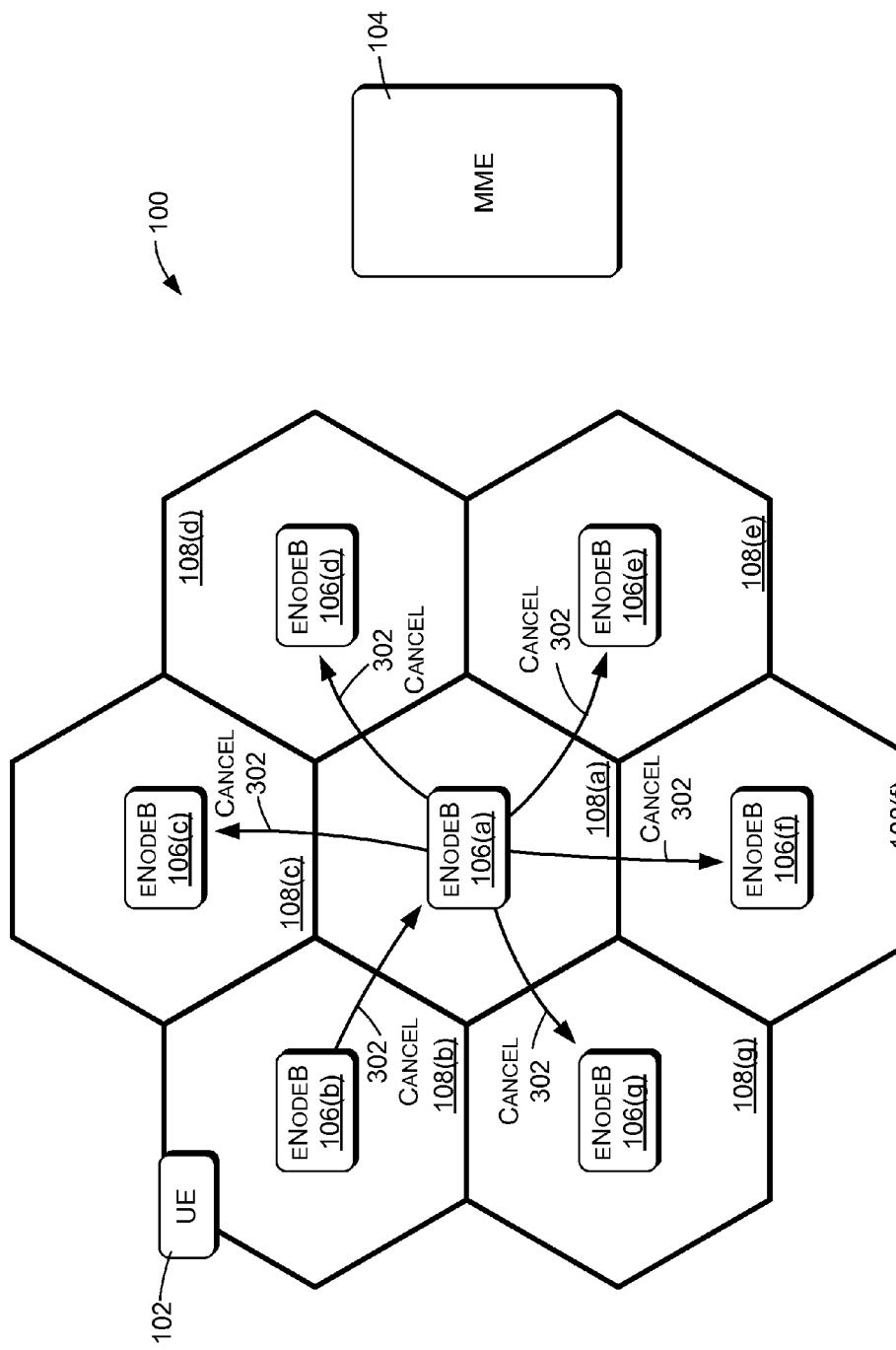
FIG. 3 is a block diagram of the telecommunication network of FIGS. 1A-1C, illustrating messaging that may be performed in order to cancel paging when the mobile communication terminal has been found.

FIG. 3 shows further actions that may be taken within the network 100 after the UE 102 is located by the eNode B 106(*b*) within the cell 108(*b*). Upon locating the UE 102, the eNode 106(*b*) may send a paging cancellation request 302 back to the eNode B 106(*a*) from which the paging request 110 was received. The eNode B 106(*a*) responds by immediately sending the cancellation request 302 to its neighboring eNode Bs or to any eNode Bs to which the eNode B 106(*a*) previously sent the paging request 110. A cancellation request instructs an eNode B to stop or cancel forwarding of the paging request 110. Each eNode B that receives the cancellation request 302 immediately forwards the cancellation request 302 on to any of its neighboring eNode Bs to which it already send the paging request. This process continues in an expanding area until all eNode Bs that received the paging request 110 have also received a cancellation request 302. Upon receiving a cancellation request, an eNode B cancels or stops any forwarding of the paging request that might otherwise have been performed.

When sending or forwarding cancellation requests, each eNode B may be configured to not forward a cancellation request to the eNode B from which the cancellation request was received.

Figure 4:
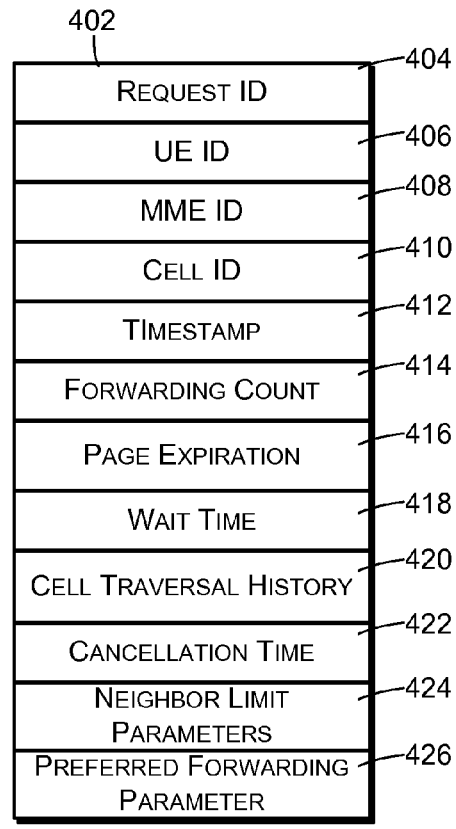
FIG. 4 is a block diagram of a data object, illustrating data that may be provided or specified by a paging request.

FIG. 4 illustrates an example composition of a data object 402 that may form the paging request 110 or that may be specified by the paging request 110. The data object 402 has a number of data fields, some of which may have values that change as the paging request 110 is forwarded from one eNode B to another eNode B. Generally, a paging request is a request by a particular entity such as an MME or eNode B, at a particular time, to locate a particular UE. A paging request can be uniquely identified by data that is specified by the paging request 110 and/or by the data object 402 of the paging request.

Note that one or more of the parameters specified by the data object 402 may in some embodiments be stored as configuration parameters by or in the eNode B, rather than transmitted with the paging request.

The data object 402 may comprise a request identifier (ID) 404 such as a serial number that is unique to the paging request 110 among all paging requests issued within the network 100. In some embodiments, the request ID 404 may be a serial number that is unique among all paging requests issued by a particular MME.

The data object 402 may also comprise a UE identifier 406 corresponding to the UE 102 that is being located and that is to be paged.

The data object 402 may also comprise an MME ID 408 corresponding to the MME or other network entity that originally issued the paging request 110.

The data object 402 may also comprise a cell ID 410 corresponding to the eNode B or multiple eNode Bs that last received a communication from the UE 102 that is to be paged. The cell ID 410 corresponds to the cell and/or eNode B to which the MME originally sent the paging request 110.

The data object 402 may also comprise a timestamp 412 specified by the originating MME, specifying an absolute or relative time at which the paging request 110 was first generated. The timestamp 412 may indicate a time in terms of the current year, the month, the day of the month, the hour, the minute, the second, and fractions of a second.

In some cases, the request ID 404 may be omitted and the paging request 110 may be uniquely identified by a combination of two or more of the UE ID 406, the MME ID 408, the cell ID 410, and/or the timestamp 412. In some cases, the request ID 404 may be used in combination with any one or more of the UE ID 406, the MME ID 408, the cell ID 410, and/or the timestamp 412 to uniquely identify the request 110 and to distinguish the paging request 110 from other paging requests 110.

The data object 402 may include one or more forwarding limit parameters, which may comprise one or more of a forwarding count or counter 414 and a page expiration time 416. The forwarding count 414 may specify an allowed number of forwarding rounds for the paging request, imposing a limit on the number of times that the paging request will be forwarded along an outward or larger sequence or chain of neighboring eNode Bs. In some cases, the forwarding count may be implemented as a counter that is decremented when the request 110 is received or forwarded by an eNode B. In FIG. 2, for example, the MME 104 may initially specify a forwarding count 414 of 3. Upon receiving the paging request, the node A may decrement the forwarding count by 1. When one of the B nodes receives the paging request, that B node may further decrement the forwarding count by 1 before forwarding the paging request to neighboring C nodes. Each receiving node is configured to forward the paging request to its neighboring nodes only when the decremented forwarding count is greater than 0. By the time the C nodes decrement the forwarding count, it has reached a value of zero and the C nodes will not perform any further forwarding.

Alternatively, or in addition, the forwarding limit may comprise a page expiration time 416, indicating a time after which sending a paging request will not begin or further forwarding will not be performed. The page expiration time 416 may be specified as an absolute time value or as a time duration relative to the timestamp 412. Before forwarding, each eNode B checks to make sure that the page expiration time 416 has not expired, and performs the forwarding only if the wait time 418 time limit has not expired.

The data object 402 may specify a wait time 418, indicating the time that the eNode B will wait before it forwards the paging request 110; but, only after not receiving a response from the UE.

The data object 402 may also include a cell traversal history 420, which indicates the eNode Bs that the paging request has traversed. For example, when receiving a paging request the receiving eNode B may append to the cell traversal history 420 an IP (Internet Protocol) address of itself. Alternatively, the sending eNode B may append the IP address of the neighboring eNode B to the cell traversal history 420 when forwarding the paging request to the receiving eNode B. The first ID in the cell traversal history 420 comprises the IP address of the first eNode B to which the request is sent. The cell traversal history 420 may be used by an eNode B to determine where to send cancellation requests.

The data object 402 may further include a cancellation time 422, indicating a time after which cancellation requests should not be initiated. The cancellation time 422 may be specified relative to the timestamp 412 or as an absolute time after which cancellation requests should not be sent. In certain embodiments, the cancellation time may be specified relative to the page expiration time 416, such as a time prior to the page expiration time 416 after which cancellation requests should not be sent. In this case, each eNode B will perform forwarding of a cancellation request only if the following condition is true:

cancellation time<page expiration time−(current time−timestamp)

The cancellation time 422 may be used in some embodiments to avoid the overhead of sending the cancellation request 302 in cases where the page expiration time 416 has nearly expired. In these cases, further forwarding is already limited by the page expiration time 416, and cancellation requests may be unnecessary.

The data object 402 may further include one or more neighbor limit parameters 424. Rather than forwarding a paging request to all eNode Bs that have been configured as neighbors, the paging request may be forwarded to only those neighboring eNode Bs that satisfy certain criteria. For example, the neighbor limit parameters 424 may comprise a utilization threshold used to limit the number of neighboring cells to which the paging request is forwarded. As one example, the utilization threshold may relate to relative measures of communications between the originating eNode B and each of the neighboring eNode Bs, such as the amounts of time that X2 logical communications links are utilized between the originating eNode B and each of the neighboring eNode Bs. In this example, the paging request is forwarded to only those neighboring eNode Bs with which the originating eNode B has communicated with for over a threshold amount of time.

As another example, the utilization threshold may relate to the number of packets sent or received over the X2 communication links between the originating eNode B and each of the neighboring eNode Bs, wherein the paging request is forwarded to only those neighboring eNode Bs whose communications have met or exceeded the specified number of packets.

The utilization threshold may be specified in various different ways to limit the number of neighboring eNode Bs to which paging requests are forwarded, based on any factors relating to interactions between the originating eNode B and the neighboring eNode Bs.

The neighbor limit parameters 424 may additionally or alternatively specify a percentage or number of the number of neighboring eNode Bs to which the paging request will be forwarded. When specifying such a percentage or number, the paging request will be forwarded to the most active neighboring eNode Bs, limited by the specified percentage or number. The percentage may be specified as a percentage of the total neighboring eNode Bs. The level of activity of a neighboring eNode B may be evaluated in terms of the number of handovers to the eNode B from the originating eNode B, the amount or duration of communications with the eNode B, etc.

In some cases, the data object 402 may include a preferred forwarding parameter 426, relating to a technique that may be used in some embodiments to send a paging request to some neighboring eNode Bs earlier than sending to others. As an example, the preferred forwarding parameter 426 may indicate a number or percentage of neighboring eNode B's that are to be prioritized. The preferred forwarding parameter 426 may be applied to a ranked list of neighboring eNode Bs, wherein the neighboring eNode Bs are ranked by the number of handovers. The neighboring eNode Bs receiving the highest number of handovers are prioritized. After prioritizing neighboring eNode Bs in this manner, the paging request is first sent to the prioritized neighboring eNode Bs and after a configurable time to the remaining neighboring eNode Bs. More specifically, the paging request is forwarded to the prioritized eNode Bs at a first time and to the non-prioritized eNode Bs at a second time, wherein the second time follows the first time by a prioritization delay.

Note that the strategy for prioritizing eNode Bs to receive earlier forwarding of paging requests may be implemented in various different ways, and the preferred forwarding parameter 426 may comprise one or more different values relating to the particular strategy.

Figure 5:
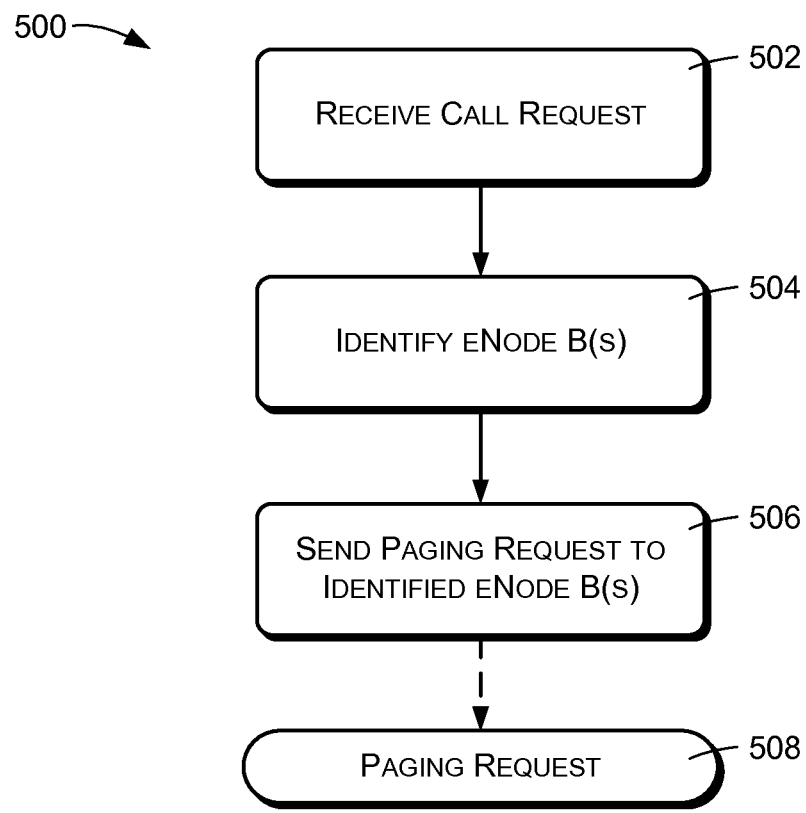
FIG. 5 is a flow diagram illustrating an example process that may be used by an MME to initiate paging of a mobile communication terminal.
Figure 6:
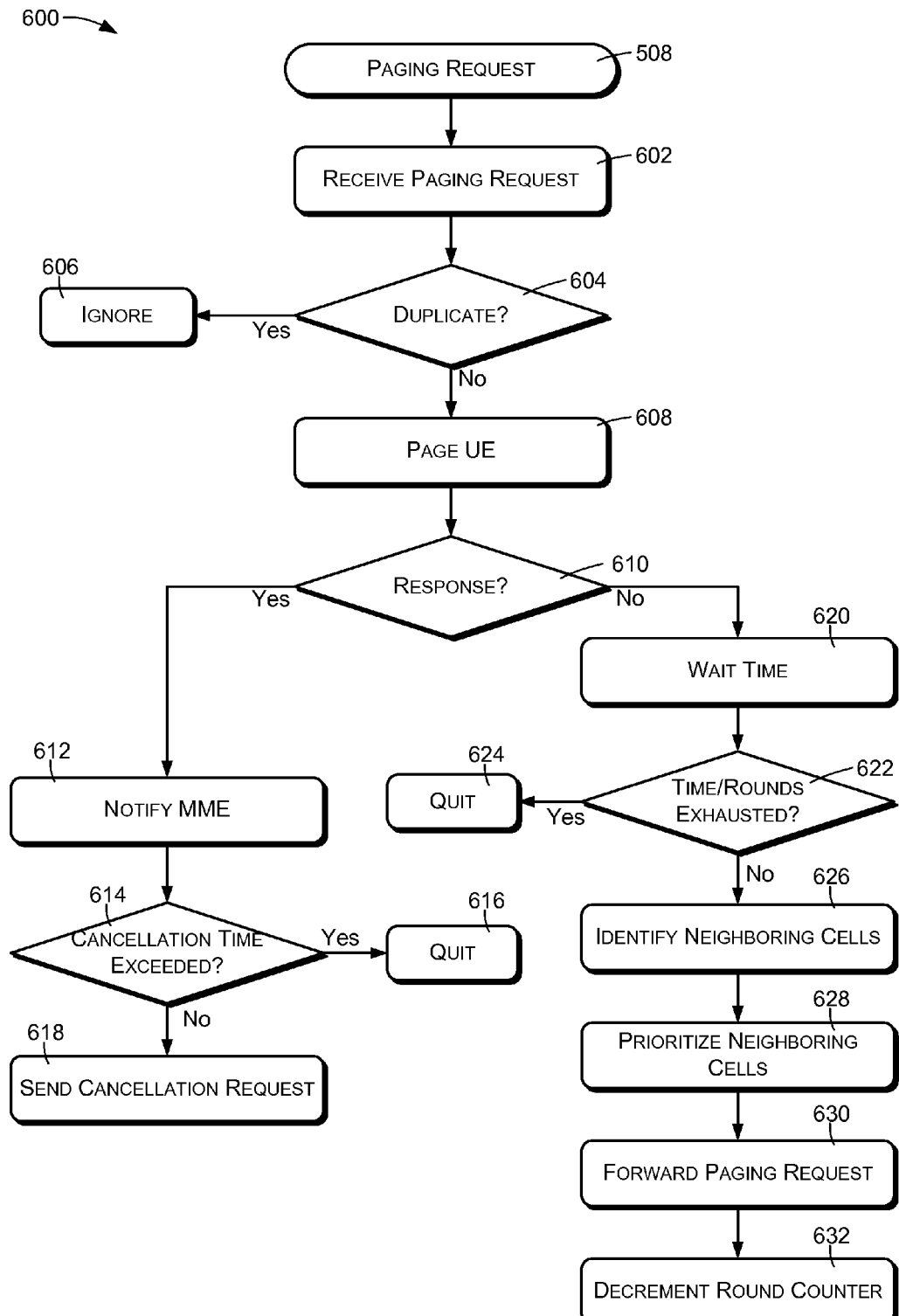
FIG. 6 is a flow diagram illustrating an example process that may be performed by a base station upon receiving a paging request.

FIGS. 5 and 6 illustrate an example method 500 of paging a mobile communication terminal, which is referred to herein as a UE. The example method 500 is described in the context of an LTE telecommunication network having multiple eNode Bs associated with respective cells of the LTE telecommunication network, although the method can be performed in other types of cellular telecommunication networks where the actions of the eNode B may be performed by different types of base stations associated respectively with the cells of the networks.

FIG. 5 illustrates actions performed by the MME 104. FIG. 6 illustrates actions performed by an eNode B upon receiving a paging request from an MME or from another eNode B.

Referring first to FIG. 5, an action 502 comprises receiving a call request for a specified UE. For example, a call request may be for initiation of a voice call to a UE.

An action 504 comprises identifying an eNode B that has previously received a communication from the specified UE. More specifically, the action 504 may comprise identifying the eNode B of the telecommunication network that most recently communicated with and/or received a communication from the UE. For purposes of discussion, the eNode B identified in this action will be referred to as the "first" eNode B, and the cell with which it is associated will be referred to as the "first" cell. In some cases, the first eNode B may comprise any eNode B within the tracking area that the UE was last known to be located. In some cases, the action 504 may comprise identifying multiple first eNode Bs within the last known tracking area of the UE.

An action 506 comprises sending a paging request 508 to the first eNode B or to multiple first eNode Bs from the MME 104 of the LTE telecommunication network. The paging request 508 specifies the UE that is to be paged by the first eNode B. The paging request may be sent using the S1 logical interface between the MME and the first eNode B. The paging request 508 may include the data object 402 as shown in FIG. 4 as well as other information that may be used in paging the specified UE. For example, the paging request may comprise or be contained within an SLAP paging message as defined by the LTE specification, with the addition of the data described with reference to FIG. 4.

Referring now to FIG. 6, an action 602 comprises receiving the paging request 508 and the specified data object 402 at a first eNode B. The paging request 508 may be received from the MME over the S1 logical interface as described above.

An action 604 comprises determining whether the received paging request 508 is a duplicate of a paging request that has already been received by the eNode B. This may be determined by referencing identifying data within the data object 402 such one or more of the request ID 404, the UE ID 406, the MME ID 408, the CELL ID 410, the timestamp 412, etc. If the received paging request 508 is a duplicate of a paging request that has already been received, an action 606 is performed of ignoring or disregarding the paging request 508 and not taking any further action with respect to the paging request 508.

If the received paging request 508 is not a duplicate, an action 608 is performed. The action 608 comprises paging the specified UE from the first eNode B. An S1AP paging message can include multiple paging records to page multiple UEs. Each UE within the first cell checks periodically with the first eNode B and if there is a paging record corresponding to the UE the UE sends an RRC connection request message back to the first eNode B. The eNode B responds with an RRC connection setup message. The action 608 may comprise multiple attempts to page the UE and each attempt the eNode B waits a certain amount of time for a response before attempting again.

An action 610 comprises determining whether the UE has responded to the paging of the action 608. In the described embodiment, this comprises determining whether the UE sends the RRC connection request mentioned above. If the UE does respond to the paging 608, an action 612 is performed of notifying the MME that the UE has been located in the first cell of the telecommunication network, whereupon the MME takes further action to establish a connection with the UE.

After notifying the MME that the UE has been located, an action 614 is performed of determining whether the cancellation time 422 has been exceeded. If the cancellation time 422 has been exceeded, no further actions are performed, as indicated by the block 616.

In the situation where the paging request 508 was received from a neighboring eNode B, an action 618 is also performed of sending a cancellation request to the neighboring eNode B from which the paging request 508 was received, as may be indicated by the cell traversal history 418.

If a response is not received from the UE in the action 610, an action 620 is performed, comprising waiting for expiration of the wait time 418.

An action 622, performed after expiration of the wait time 418, comprises determining whether a forwarding limit has been reached. As described above, the forwarding limit may comprise a time limit such as specified by the page expiration time 416 or a limit on the number of times that the paging request can be forwarded such as specified by the forwarding count 414.

For example, the action 622 may comprise comparing the page expiration time 416 to the current time relative to the timestamp 412 to determine whether the page expiration time 416 has elapsed. Alternatively, or in addition, the action 622 may comprise comparing a number limit to the number of times that the paging request 508 has already been forwarded to determine whether the number limit has been exceeded. In some cases, the forwarding count 414 may comprise a count that is decremented every time the paging request is forwarded, and the action 622 may therefore comprise comparing the forwarding count 414 to 0. If the forwarding count is 0, an action 624 is performed of quitting or ending the method 600. That is, no further action is taken in response to the received paging request 508.

If the page expiration time 416 has not elapsed and the forwarding count 414 has not been exhausted, an action 626 is performed of identifying eNode Bs of network cells that geographically neighbor the first cell. For purposes of discussion, these eNode Bs will be referred to as "second" eNode Bs, and the cells with which they are associated will be referred to as "second" cells. The second eNode Bs may be identified by referencing a neighbor list maintained by the first eNode B, which indicates the IP (Internet Protocol) network addresses of eNode Bs that have been configured as being associated with neighboring cells.

In some implementations, the action 626 may be responsive to the neighbor utilization threshold 424 of FIG. 4, and may identify only those cells that both neighbor the first eNode B and that have been most highly utilized by the first eNode B, such as may be evaluated in terms of the neighbor utilization threshold 424 as already described.

An action 628, which may be performed in certain embodiments, comprises prioritizing the identified second neighboring cells and associated eNode Bs. For example, the action 628 may comprise selecting and prioritizing those neighboring eNode Bs that have received the highest numbers of call handovers from the first eNode B. The number of prioritized cells may be configured by the preferred forwarding parameter 426 as a percentage of neighboring cells or as a number of neighboring cells.

An action 630 performed after identifying and prioritizing the second cells and associated second eNode Bs, comprises forwarding the paging request from the first eNode B to the second eNode Bs using X2 logical interfaces between the first eNode B and the second eNode Bs, respectively. Paging requests may be forwarded without communicating with the MME.

In some embodiments, the action 630 may be performed in two stages. In a first stage, the paging request is forwarded to the prioritized second eNode Bs. In a second stage, which may be delayed by a predetermined or configurable time after the first stage, the paging request is forwarded to the remaining, non-prioritized second eNode Bs.

In some embodiments, the action 630 may be limited to a subset of the available neighboring eNode Bs, as specified by the one or more neighbor limit parameters 424 described above.

Upon or in conjunction with forwarding the paging request to the second eNode Bs, an action 632 is performed of decrementing the forwarding limit 414 to indicate that another round of forwarding has taken place.

Each of the second eNode Bs may also perform the method 600 in response to receiving a paging request. When a particular second eNode B fails to receive a response to paging the UE, the second eNode B forwards the paging request to a plurality of neighboring third eNode Bs using X2 logical interfaces.

Figure 7:
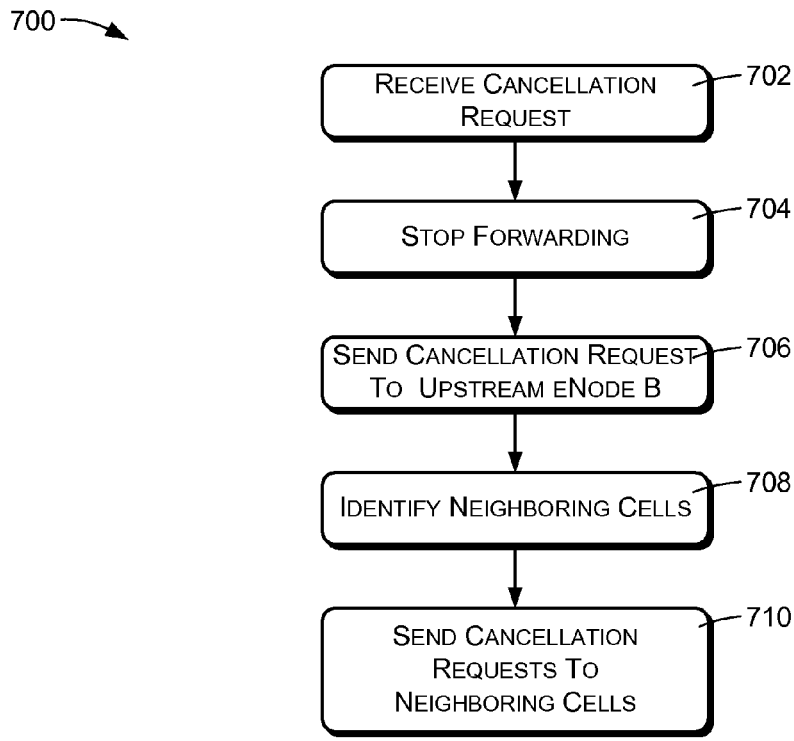
FIG. 7 is a flow diagram illustrating an example process that may be performed by a base station to cancel forwarding of paging requests.

FIG. 7 illustrates an example method that may be performed by an eNode B or other base station upon receiving a cancellation request from another eNode B. For purposes of discussion, the eNode B that receives the cancellation request will be referred to as the "first" eNode B.

An action 702 comprises receiving a cancellation request. For example, the action 702 may comprise receiving the cancellation request generated in the action 618. As another example, a cancellation request may be received as a result of the actions 706 and/or 710 described below. The cancellation request corresponds to a particular paging request and may include the data object 402 of the paging request.

In response to receiving the cancellation request, an action 704 is performed of stopping or discontinuing forwarding by the first eNode B of the paging request to neighboring eNode Bs.

An action 706 comprises sending or forwarding the cancellation request to an upstream eNode B from which the cancellation request was received by the first eNode B. The identity of the upstream eNode B from which the cancellation request was received can be determined by examining the cell traversal history 420 of the data objet 402.

An action 708 comprises identifying cells that neighbor the cell of the first eNode B. The eNode Bs of the neighboring cells will be referred to as second eNode Bs. The first eNode B may refer to its neighbor list to identify neighboring second eNode Bs.

An action 710 comprises sending cancellation requests to the second eNode Bs. The cancellation requests may be sent using the X2 logical interfaces between the first eNode B and the second eNode Bs.

In accordance with the method 700, received cancellation requests are propagated upstream by referencing the cell traversal history 420. Each of the eNode Bs that receives such a cancellation request then also forwards the cancellation request back downstream to the eNode Bs of its neighboring cells.

Figure 8:
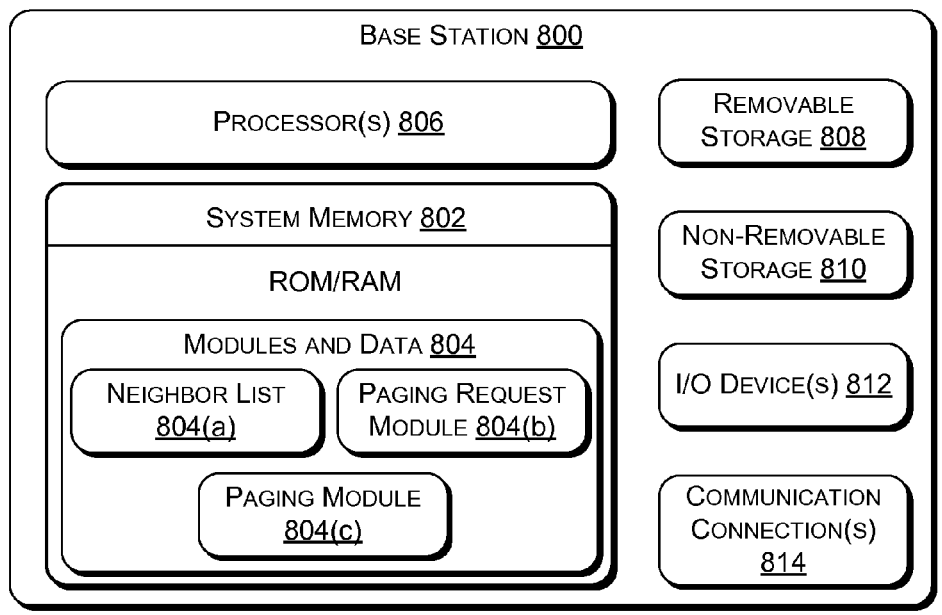
FIG. 8 is a block diagram illustrating high-level components and functionality of a base station.

FIG. 8 illustrates high-level components and functionality of an example eNode B base station 800 such as may be used to implement the techniques described above. As illustrated, the base station 800 comprises system memory 802 storing modules and data 804. Also, the base station 800 includes processor(s) 806, a removable storage 808 and non-removable storage 810, input/output (I/O) device(s) 812, and communication connections 814.

In various embodiments, the system memory 802 is volatile (such as RAM), non-volatile (such as ROM, flash memory, etc.) or some combination of the two. The modules and data 804 stored in the system memory 802 may comprise methods, threads, processes, applications or any other sort of computer-executable instructions, such as the instructions utilized to perform the operations of the base station 800. The modules and data 804 may also include files and databases.

As a specific example, the modules and data 804 may include a neighbor list 804(a) as described above, comprising data identifying the base stations of geographically neighboring cells. As another example, the modules and data 804 may comprise a paging request module 804(b) that handles received paging requests and that responds to paging requests as described above. The modules and data 804 may also include a paging module 804(c) that is responsible for paging UEs in response to received paging requests.

The modules and data 804 may include various other modules and data that are responsible for general operation of the eNode B. Generally, the modules and data 804 implement algorithms, examples of which are illustrated by FIGS. 5, 6, and 7.

In some embodiments, the processor(s) 806 is a central processing unit (CPU), a graphics processing unit (GPU), or both CPU and GPU, or other processing unit or component known in the art.

The base station 800 also includes additional data storage devices (removable and/or non-removable) such as, for example, magnetic disks, optical disks, or tape. Such additional storage is illustrated in FIG. 8 by removable storage 808 and non-removable storage 810. Tangible computer-readable media may include volatile and nonvolatile, removable and non-removable media implemented in any method or technology for storage of information, such as computer readable instructions, data structures, program modules, or other data. The system memory 802, removable storage 808 and non-removable storage 810 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the base station 800. Any such tangible computer-readable media may be part of the base station 800.

The base station 800 also has communication connections 814 that allow the base station 800 to communicate with other computing devices such as other base stations and/or MMEs. In some embodiments, the communication connections 814 are associated with wireless transceivers, such a radio antennas or modems or WiFi modems. The communication connections 814 may also include components associated with wired interfaces such as Ethernet interfaces.

Although the certain techniques are described in the context of an LTE telecommunication network, the same or similar techniques may be performed in other types of cellular networks including LTE Advanced networks, High Speed Packet Access (HSPA) networks, Evolved High Speed Packet Access (HSPA+) networks, Universal Mobile Telecommunication System (UMTS) networks, Code Division Multiple Access (CDMA) networks, Evolution Data Optimized (EV-DO) networks, Global System for Mobile Communications (GSM) networks, WiMAX networks, or any other network that has inter-connected cells, etc.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of paging a mobile communication terminal in a Long Term Evolution (LTE) telecommunication network having multiple eNode Bs associated with respective cells of the LTE telecommunication network, the method comprising:
   identifying a first eNode B, wherein the first eNode B is associated with a first cell of the LTE telecommunication network;
   sending a first paging request to the first eNode B from a mobility management entity (MME) of the LTE telecommunication network using an S1 logical interface between the MME and the first eNode B;
   receiving the first paging request at the first eNode B;
   paging the mobile communication terminal from the first eNode B;
   determining that the mobile communication terminal has not responded to the paging; and
   in response to determining that the mobile communication terminal has not responded to the paging, (a) identifying a plurality of second eNode Bs that are associated respectively with cells of the LTE telecommunication network that geographically neighbor the first cell, and (b) forwarding the first paging request from the first eNode B to the second eNode Bs using X2 logical interfaces between the first eNode B and the second eNode Bs, respectively.

2. The method of claim 1, wherein the forwarding comprises forwarding the first paging request to a group of the second eNode Bs that have been most highly utilized by the first eNode B.

3. The method of claim 1, further comprising waiting for a wait time after determining that the mobile communication terminal has not responded to the paging before forwarding the first paging request.

4. The method of claim 1, further comprising:
   receiving a second paging request at the first eNode B;
   determining that the second paging request is a duplicate of the first paging request; and
   in response to determining that the second paging request is a duplicate of the first paging request, disregarding the second paging request.

5. The method of claim 1, wherein identifying the first eNode B comprises determining which of the multiple eNode Bs most recently received a communication from the mobile communication terminal.

6. The method of claim 1, wherein identifying the first eNode B comprises identifying an LTE tracking area within which the mobile communication terminal is located, the method further comprising sending the first paging request from the MME to multiple eNode Bs associated with the LTE tracking area.

7. The method of claim 1, further comprising
receiving the first paging request by one of the second eNode Bs, wherein the one of the second eNode Bs is associated with a second cell;
paging the mobile communication terminal from the one of the second eNode Bs;
determining that the mobile communication terminal has not responded to the paging from the one of the second eNode Bs;
in response to determining that the mobile communication terminal has not responded to the paging from the one of the second eNode Bs, identifying a plurality of third eNode Bs that are associated respectively with cells of the LTE telecommunication network that neighbor the second cell; and
forwarding the first paging request from the one of the second eNode Bs to the third eNode Bs using X2 logical interfaces between the one of the second eNode Bs and the third eNode Bs, respectively.

8. The method of claim 1, wherein the first paging request specifies a forwarding limit, the method further comprising:
receiving the first paging request by one of the second eNode Bs;
paging the mobile communication terminal from the one of the second eNode Bs;
determining that the mobile communication terminal has not responded to the paging from the one of the second eNode Bs;
determining that the forwarding limit has not been exceeded; and
in response to determining forwarding limit has not been exceeded, forwarding the first paging request from the one of the second eNode Bs to third eNode Bs using X2 communication interfaces between the one of the second eNode Bs and the third eNode Bs, respectively.

9. The method of claim 8, wherein the forwarding limit comprises one or more of:
a time limit; or
a limit on a number of times that the first paging request is forwarded.

10. The method of claim 1, wherein forwarding the first paging request comprises:
prioritizing multiple ones of the second eNode Bs;
forwarding the first paging request to the prioritized second eNode Bs at a first time;
forwarding the first paging request to second eNode Bs other than the prioritized second eNode Bs at a second time;
wherein the second time follows the first time by a prioritization delay.

11. The method of claim 1, further comprising:
receiving the first paging request at a third eNode B, wherein the third eNode B is associated with a third cell;
paging the mobile communication terminal from the third eNode B;
determining that the mobile communication terminal has responded to the paging from the third eNode B; and
in response to determining that the mobile communication terminal has responded to the paging from the third eNode B, sending a cancellation request to one or more fourth eNode Bs that are associated respectively with cells of the LTE telecommunication network that geographically neighbor the third cell, wherein the cancellation request instructs the fourth eNode Bs to cancel forwarding of the first paging request.

12. A first base station for use in association with a first cell of a cellular telecommunication network, the first base station comprising:
one or more processors;
one or more non-transitory computer-readable media storing computer-executable instructions that, when executed on the one or more processors, cause the one or more processors to perform actions comprising:
receiving a paging request that specifies a mobile communication terminal;
paging the mobile communication terminal in response to receiving the paging request;
determining that the mobile communication terminal has not responded to the paging; and
in response to determining that the mobile communication terminal has not responded to the paging, (a) identifying a plurality of second base stations that are associated respectively with cells of the cellular telecommunication network that geographically neighbor the first cell, and (b) forwarding the paging request from the first base station to the second base stations;
the one or more non-transitory computer-readable media also storing data identifying the cells of the cellular telecommunication network that geographically neighbor the first cell.

13. The first base station of claim 12, the actions further comprising:
receiving a cancellation request corresponding to the paging request, wherein the cancellation request specifies a cell traversal history;
examining the cell traversal history to determine an upstream base station from which the paging request was received; and
forwarding the cancellation request to the upstream base station.

14. The first base station of claim 12, wherein the first base station comprises a Long Term Evolution (LTE) eNode B.

15. The first base station of claim 12, wherein:
the cellular telecommunication network comprises a Long Term Evolution (LTE) network; and
forwarding the paging request from the first base station to the second base stations uses X2 logical interfaces of the LTE network.

16. The first base station of claim 12, wherein the receiving comprises receiving the paging request from a management component of the cellular telecommunication network over a backhaul communication channel between the management component and the first base station.

17. The first base station of claim 12, wherein the receiving comprises receiving the paging request from a third base station of the cellular telecommunication network.

18. The first base station of claim 12, wherein forwarding the paging request from the first base station to the plurality of second base stations comprises communicating with each second base station using a Long Term Evolution (LTE) X2 logical interface between the first base station and the second base station.

19. The first base station of claim 12, wherein the receiving comprises receiving the paging request from a third base station of the cellular telecommunication network using a Long Term Evolution (LTE) X2 logical interface between the first base station and the third base station.

20. The first base station of claim 12, wherein:
the paging request specifies a neighbor limit parameter; and
identifying the plurality of second base stations comprises limiting a number of the identified plurality of second base stations based at least in part on the neighbor limit parameter.

21. The first base station of claim 12, wherein forwarding the paging request comprises:
prioritizing multiple ones of the second base stations;
forwarding the paging request to the prioritized second base stations at a first time;
forwarding the paging request to second base stations other than the prioritized second base stations at a second time;
wherein the second time follows the first time by a prioritization delay.

22. A method performed by a first base station for use in association with a first cell of a cellular telecommunication network, the method comprising:
receiving a first paging request that specifies a first mobile communication terminal;
paging the first mobile communication terminal in response to receiving the paging request;
determining that a response from the first mobile communication terminal to the paging has not been received; and
in response to determining that a response from the first mobile communication terminal to the paging has not been received, (a) identifying a plurality of second base stations that are associated respectively with cells of the cellular telecommunication network that geographically neighbor the first cell, and (b) forwarding the first paging request from the first base station to the second base stations,
the first base station storing data identifying the cells of the cellular telecommunication network that geographically neighbor the first cell.

23. The method of claim 22, wherein the receiving comprises receiving the first paging request from a management component of the cellular telecommunication network over a backhaul communication channel between the management component and the first base station.

24. The method of claim 22, wherein the receiving comprises receiving the first paging request from a third base station of the cellular telecommunication network.

25. The method of claim 22, further comprising:
receiving a second paging request from a third base station of the cellular telecommunication network, wherein the second paging request specifies a second mobile communications terminal;
paging the second mobile communication terminal;
receiving a response from the second mobile communication terminal; and
sending a paging cancellation request to the third base station.

26. The method of claim 22, wherein forwarding the first paging request from the first base station to the plurality of second base stations comprises communicating with each second base station using a Long Term Evolution (LTE) X2 logical interface between the first base station and the second base station.

27. The method of claim 22, wherein the receiving comprises receiving the first paging request from a third base station of the cellular telecommunication network using a Long Term Evolution (LTE) X2 logical interface between the first base station and the second base station between the first base station and the third base station.

28. The method of claim 22, wherein forwarding the first paging request comprises:
prioritizing multiple ones of the second base stations;
forwarding the paging request to the prioritized second base stations at a first time;
forwarding the paging request to second base stations other than the prioritized second base stations at a second time;
wherein the second time follows the first time by a prioritization delay.

* * * * *